United States Patent
Bassett et al.

(10) Patent No.: US 10,338,700 B2
(45) Date of Patent: Jul. 2, 2019

(54) STYLUS INKWELL CHARGER INCLUDING A CAVITY HAVING A MAGNETIC PORTION TO FACILITATE ALIGNMENT OF A STYLUS' ELECTRICAL CONTACT WITH THE CHARGER'S ELECTRICAL CONTACT

(71) Applicant: Hewlett-Packard Development Company, L.P., Houston, TX (US)

(72) Inventors: Jonathan D. Bassett, Fort Collins, CO (US); David Quijano, Fort Collins, CO (US); Owen Richard, Fort Collins, CO (US); Thomas Aaron Bondurant, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 66 days.

(21) Appl. No.: 15/495,858

(22) Filed: Apr. 24, 2017

(65) Prior Publication Data
US 2018/0307336 A1   Oct. 25, 2018

(51) Int. Cl.
*G06F 3/042*     (2006.01)
*G06F 3/0354*    (2013.01)
*G06F 3/039*     (2013.01)
*H02J 7/00*      (2006.01)

(52) U.S. Cl.
CPC .......... *G06F 3/03545* (2013.01); *G06F 3/039* (2013.01); *H02J 7/0045* (2013.01)

(58) Field of Classification Search
None
See application file for complete search history.

(56) References Cited

U.S. PATENT DOCUMENTS

| 5,529,501 | A  | * | 6/1996  | Maruyama | ............... B43K 8/22 345/179 |
| 7,026,789 | B2 |   | 4/2006  | Bozzone et al. | |
| 2008/0200092 | A1 | * | 8/2008  | Chung | ................... A63H 33/26 446/131 |
| 2011/0279081 | A1 | * | 11/2011 | Cacioppo | ............ G06F 3/03545 320/108 |
| 2012/0162059 | A1 | * | 6/2012  | Chuang | ................... G06F 3/039 345/156 |
| 2014/0340368 | A1 |   | 11/2014 | Locker et al. | |

(Continued)

FOREIGN PATENT DOCUMENTS

| CN | 205334388 U | 6/2016 | | |
| WO | WO-2015200564 A1 | * | 12/2015 | ......... G06F 3/03545 |
| WO | WO 2015200564 A1 | * | 12/2015 | ......... G03F 3/03545 |

OTHER PUBLICATIONS

Dictionary.com definition of aperture, https://www.dictionary.com/browse/aperture?s=t, p. 1.*

(Continued)

*Primary Examiner* — Lunyi Lao
*Assistant Examiner* — Kirk W Hermann
(74) *Attorney, Agent, or Firm* — Brooks, Cameron & Huebsch PLLC

(57) ABSTRACT

In one example, an inkwell charger can include a tapered portion of a cavity comprising an electrical contact to receive a corresponding tapered portion of a stylus and a magnetic portion of the cavity positioned below the tapered portion of the cavity to align the tapered portion of the stylus with the tapered portion of the cavity.

15 Claims, 3 Drawing Sheets

(56) References Cited

U.S. PATENT DOCUMENTS

| 2015/0378455 | A1  | 12/2015 | Immel et al. |
| 2016/0034054 | A1  | 2/2016  | Utykanski et al. |
| 2016/0056648 | A1* | 2/2016  | Dowd ................... H02J 7/0042 |
|              |     |         | 320/107 |
| 2018/0034295 | A1* | 2/2018  | Massar ................. H02J 7/0027 |
| 2018/0309309 | A1* | 10/2018 | Choe ......................... G01J 1/02 |

OTHER PUBLICATIONS

Lachance, C., "Best Apple Pencil accessories", Aug. 22, 2016, http://www.imore.com/apple-pencil-accessories, 14 pages.

* cited by examiner

STYLUS INKWELL CHARGER INCLUDING A CAVITY HAVING A MAGNETIC PORTION TO FACILITATE ALIGNMENT OF A STYLUS' ELECTRICAL CONTACT WITH THE CHARGER'S ELECTRICAL CONTACT

BACKGROUND

A stylus can be a peripheral device utilized with a computing device to interact with a user interface surface of the computing device and/or applications of the computing device. For example, a stylus can be a pen or pencil shaped device that can be utilized to make selections on a touch screen displaying a graphical user interface. In some examples, the stylus can be utilized with the user interface surface in a similar manner to a pencil or pen being utilized with a sheet of paper. In some examples, the stylus can include a battery for performing additional functions. For example, the stylus can include a number of inputs that can perform additional functions such as instructing the computing device to take a screen shot or to display additional options corresponding to the stylus.

DETAILED DESCRIPTION

Figure 1:
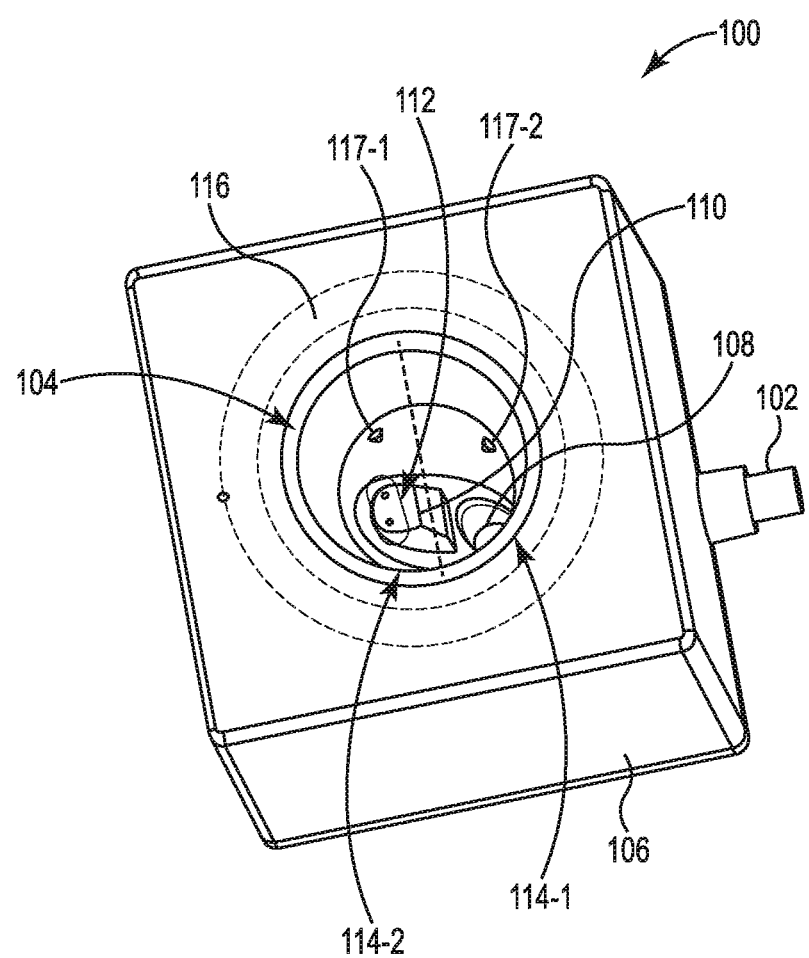
FIG. 1 illustrates an example of an inkwell charger consistent with the present disclosure.

A number of systems and devices for a stylus inkwell charger are described herein. In some examples, an inkwell charger can include a tapered portion of a cavity comprising an electrical contact to receive a corresponding tapered portion of a stylus and a magnetic portion of the cavity positioned below the tapered portion of the cavity to align the tapered portion of the stylus with the tapered portion of the cavity. As used herein, a stylus inkwell charger can be a device that can receive an end of a stylus for charging and positioning the stylus in a substantially vertical position. In some examples, the substantially vertical position can be a position where the stylus is substantially perpendicular to a work surface when in a charging position.

A stylus inkwell charger can be easier to access and store compared to other types of stylus charging devices. For example, the substantially vertical position of the stylus when positioned within the inkwell charger can allow a user to more easily access the stylus for use. In addition, a stylus inkwell charger can have a relatively smaller footprint compared to other types of stylus charging devices. For example, the substantially vertical position of the stylus and the relatively small dimensions of the inkwell charger can allow a user to position the inkwell charger on a work surface with relatively less space. In addition, the substantially vertical position of the stylus can increase an overall height of the system such that the inkwell charger can be positioned behind other objects and still be accessed by a user.

In some examples, the stylus inkwell charger described herein can align the stylus into a charging position despite a rotational position of the stylus when inserted into the inkwell charger. For example, the charging position can be a position where electrical contacts of the inkwell charger align and/or make contact with electrical contacts of the stylus. In this example, the stylus can be positioned within the inkwell charger and the inkwell charger can alter a rotational position of the stylus to align and/or connect the electrical contacts of the stylus with the electrical contacts of the inkwell charger. In some examples, a tapered portion of the inkwell charger and a corresponding tapered portion of the stylus can be utilized to alter the rotational position of the stylus within the cavity of the inkwell charger. In some examples, a magnetic portion of the inkwell charger can provide a force (e.g., downward force, force toward a bottom of a cavity, etc.) on the stylus to alter the rotational position of the stylus within the cavity of the inkwell charger. For example, when the magnetic portion of the inkwell charger provides force on the stylus, the tapered portion of the inkwell charger and corresponding tapered portion of the stylus can provide directional force to alter the rotational direction of the stylus.

The stylus inkwell charger described herein can provide an inkwell style (e.g., cavity style, etc.) charging device for a stylus that can enable a user to insert the stylus into a cavity of the inkwell charger at a plurality of different rotational positions. This can save time for the user by providing an easier process for inserting the stylus into the inkwell charger. In addition, the stylus inkwell charger described herein can ensure that the stylus is actually making an electrical connection with the inkwell charger by altering the rotational position of the stylus to the charging position.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of an inkwell charger 100 consistent with the present disclosure. In some examples, the inkwell charger 100 can be a stylus charger that can position the stylus in a substantially vertical position or a substantially perpendicular position. For example, the inkwell charger 100 can be positioned on a work surface (e.g., desktop, counter, etc.) and position the stylus in a position that is substantially perpendicular to the work surface. As described herein, the substantially vertical position or the substantially perpendicular position of the stylus can reduce the footprint of the inkwell charger 100 and stylus when the stylus is in the charging position.

In some examples, the inkwell charger 100 can include an electrical connection 102. The electrical connection 102 can be utilized to connect the inkwell charger 100 to an electrical source (e.g., power outlet, electrical grid, etc.). In some examples, the electrical connection 102 can be connected to a plug (e.g., outlet plug, universal serial bus (USB) connection, etc.). In some examples, the electrical connection 102 can be coupled to a housing 106 of the inkwell charger 100.

In some examples, the inkwell charger 100 can include a cavity 104 that can receive an end of a stylus. For example, the cavity 104 can be an aperture or indentation of the housing 106 can include a diameter that is large enough to receive an end of the stylus. In this example, a diameter of the stylus can be less than the diameter of the cavity 104. The cavity 104 can include a depth that allows edges of the cavity 104 to position the stylus in a substantially vertical or substantially perpendicular position as described herein. For example, the cavity 104 have a depth to allow the stylus to stay in the substantially vertical or substantially perpendicular position.

In some examples, the inkwell charger 100 can include a cavity 104 that is tapered or includes a tapered portion. In some examples, the tapered portion of the cavity 104 can be a tapered slope of the cavity 104 from a first side 114-1 to a second side 114-2. For example, the first side 114-1 of the cavity 104 can have a greater depth than the second side 114-2 of the cavity 104. In some examples, the tapered portion can include a slope from the second side 114-2 downward toward the first side 114-1. As described further herein, the tapered portion of the cavity 104 can be utilized to alter a rotational position of a stylus when an end of the stylus is placed within the cavity 104.

In some examples, the inkwell charger 100 can include a tip aperture 108 positioned on the first side 114-1 of the cavity 104. In some examples, the tip aperture 108 can be utilized to align the tip of the stylus. In some examples, the tip aperture 108 can be utilized to protect the tip of the stylus. For example, the tip aperture 108 can be utilized to separate the tip of the stylus from the surrounding area.

In some examples, the inkwell charger 100 can include a ledge 110 that includes a number of electrical contacts 112. In some examples, the ledge 110 can be positioned on the tapered portion of the cavity 104. In some examples, the ledge 110 can be positioned near a higher portion of the tapered portion. For example, the ledge 110 can be positioned on the second side 114-2 of the cavity 104 and can be positioned at a relatively higher level compared to the tip aperture 108 positioned on the first side 114-1 of the cavity 104.

In some examples, the ledge 110 can protrude from a surface of the tapered portion of the cavity 104. In some examples, the number of electrical contacts 112 can be positioned on the ledge 110. For example, the ledge 110 can include a raised portion above the tapered portion to provide a relatively flat area for the number of electrical contacts 112. In this example, the ledge 110 can provide a contact surface to receive a corresponding contact surface of the stylus. The relatively flat area of the ledge 110 can provide a more reliable connection between the electrical contacts 112 and corresponding electrical contacts of the stylus. In some examples, the stylus can include a corresponding indentation to receive the ledge 110. In these examples, the ledge 110 and corresponding indentation of the stylus can help align the stylus in the charging position.

In some examples, the electrical contacts 112 can be utilized to transfer electrical energy provided by the electrical connection 102 to the stylus. In some examples, the electrical energy provided to the stylus can be utilized to charge a battery. In some examples, electrical contacts 112 can be pogo pin electrical contacts. As used herein, a pogo pin electrical contact can include an electrical connector that includes a number of spring-loaded pins that can be depressed to make an electrical connection with a corresponding pogo pad electrical contact. In some examples, the corresponding pogo pad electrical contact can be a metallic pad that can depress the spring-loaded pins of the pogo pin electrical contacts and receive electrical energy.

In some examples, the cavity 104 can include a plurality of protrusions 117-1, 117-2 that are attached within the cavity 104. In some examples, the plurality of protrusions 117-1, 117-2 can be utilized to interact with an enclosure of the stylus when the stylus is positioned within the cavity 104. In some examples, the plurality of protrusions 117-1, 117-2 can reduce friction between the enclosure of the stylus and the edges of the cavity 104. For example, the plurality of protrusions 117-1, 117-2 can include protruding features (e.g., embosses, etc.) that protrude from the surface of the cavity 104 and prevent the stylus from "sticking" in a non-charging position. That is, the plurality of protrusions 117-1, 117-2 can improve altering the rotational position of the stylus into a charging position as described herein.

In some examples, the inkwell charger 100 can include a magnetic portion 116. The magnetic portion 116 can be positioned below the cavity 104 within the enclosure 106. In some examples, the magnetic portion 116 can surround the cavity 104. For example, the magnetic portion can be position below the cavity 104 with a circumference that is the same or similar as the cavity 104. In some examples, the magnetic portion 116 can be in the shape of ring structure positioned below the cavity 104. For example, the magnetic portion 116 can be a ring magnet with a circular shape and a hole in the center. In this example, the hole in the center of the ring magnet can have a circumference that is the same or similar as the circumference of the cavity 104.

In some examples, the magnetic portion 116 can be an object made from a material that is magnetized or creates a magnetic field (e.g., permanent magnet, etc.). In some examples, the magnetic portion 116 can be an object that utilizes electrical energy to generate a magnetic field (e.g., electrical magnet, etc.). As used herein, a magnet or magnetic material of the magnetic portion is a device or material that creates a magnetic field that can pull on ferromagnetic materials or other magnetics.

In some examples, the magnetic portion 116 can interact with a ferromagnetic material within the stylus to alter a rotational position of the stylus as described herein. For example, the magnetic portion 116 can create a magnetic field within the cavity 104 to pull the stylus into the cavity 104. In some examples, the magnetic field can pull the tapered portion of the stylus into the tapered portion of the cavity 104. In some examples, the magnetic field can pull the tip of the stylus into the tip aperture 108 within the cavity 104. In some examples, the magnetic field can pull the indentation of the stylus into contact with the ledge 110 within the cavity 104. In addition, the magnetic field can pull the pogo pad electrical contacts of the stylus to depress the pogo pin electrical contacts of the cavity 104.

In some examples, the combination of the magnetic field provided by the magnetic portion, the tapered portion, the ledge 110, and/or the tip aperture 108 can reposition a stylus from a non-charging position to a charging position. For example, the combination can alter a rotational position of the stylus to align the electrical contacts of the stylus with the electrical contacts 112 of the cavity 104. In this example, the stylus could be inserted into the cavity 104 at a first rotational position within the cavity 104 where the tapered portion of the stylus is not aligned with the tapered portion of the cavity 104. In this example, the combination can alter the rotational position of the stylus from the first rotational position to a second rotational position where the electrical contacts of the stylus are aligned with the electrical contacts 112 of the cavity 104.

The inkwell charger 100 can be utilized to charge a corresponding stylus. In some examples, the inkwell charger 100 can be utilized to receive the stylus at a plurality of different rotational positions and alter the plurality of different rotational positions to a charging position as described herein. This can enable a user to insert the stylus at any position and not worry that the stylus is not charging due to the stylus being inserted at a non-charging position.

Figure 2:
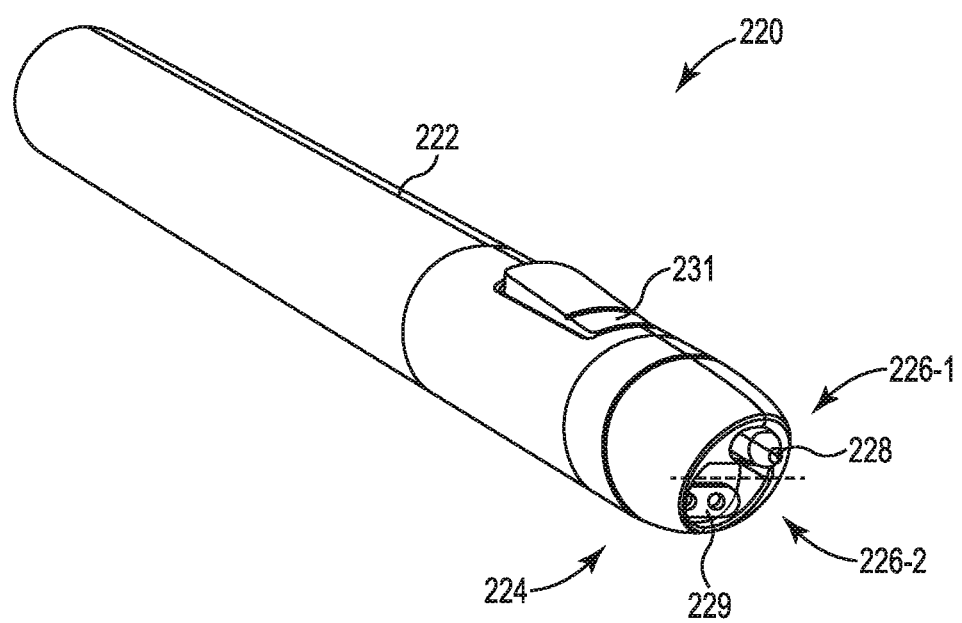
FIG. 2 illustrates an example of a stylus consistent with the present disclosure.

FIG. 2 illustrates an example of a stylus 220 consistent with the present disclosure. In some examples, the stylus 220 can be a peripheral device for a computing device. In some examples, the stylus 220 can be utilized to make selections on a user interface surface (e.g., touch screen surface, etc.). For example, the stylus 220 can include a stylus tip 228 that can make selections when the stylus tip 228 makes contact with the user interface surface.

In some examples, the stylus 220 can include an enclosure 222 that can protect computing components within the stylus 220. In some examples, the enclosure 222 can be a polymer material and/or metallic material that can prevent elements around the stylus 220 from damaging the computing components. In some examples, the enclosure 222 can be utilized to protect a battery or other type of power source from damage due to exterior elements. In some examples, stylus 220 can include a functional end 224 that can include the stylus tip 228. In some examples, the functional end 224 can be utilized when interacting with a user interface surface or display. For example, the functional end 224 can include the stylus tip 228 which can be utilized to interact with the user interface surface as described herein.

In some examples, the functional end 224 of the stylus 220 can include a first side 226-1 and a second side 226-2. In some examples, the first side 226-1 can be a corresponding side to a first side of an inkwell charger as described herein. For example, the first side 226-1 can be a corresponding side to the first side 114-1 of the cavity 104 as referenced in FIG. 1. In this example, the first side 226-1 can be a relatively longer portion of a tapered portion of the functional side 224. In this example, the first side 226-1 can be positioned deeper within the cavity of an inkwell charger as described herein.

In some examples, the second side 226-2 can be a corresponding side to a second side of an inkwell charger as described herein. For example, the second side 226-2 can be a corresponding side to the second side 114-2 of the cavity 104 as referenced in FIG. 1. In this example, the second side 226-2 can be a relatively shorter portion of a tapered portion of the functional side 224. In this example, the second side 226-2 can be positioned at a more shallow position within the cavity compared to the first side 226-1, as described herein.

In some examples, the first side 226-1 can include the stylus tip 228. As described herein, the first side 226-1 can extend beyond the second side 226-2. In some examples, having the first side 226-1 extend beyond the second side 226-2 can protrude the stylus tip 228 further than if the first side 226-1 and the second side 226-1 were even or substantially even. That is, the tapered portion of the functional side 224 can prevent a user from unintentionally making contact on a user interface surface or work surface with the second side 226-2.

In some examples, the second side 226-2 can include a number of electrical contacts 229. As described herein, the electrical contacts 229 can be pogo pad electrical contacts that can correspond to pogo pin electrical contacts of an inkwell charger. As described herein, the pogo pad electrical contacts can be utilized to depress the spring-loaded pogo pin electrical contacts of the inkwell charger. As described herein, the electrical contacts 229 can be positioned on the second side 226-2, such that the electrical contacts 229 are positioned relatively lower than the first side 226-1, which can prevent the electrical contacts 229 from interfering with the use of the stylus 220.

In some examples, the functional side 224 of the stylus 220 can include a ferromagnetic material positioned within the enclosure 222 of the stylus 220. As described herein, the ferromagnetic material can interact with a magnetic portion of an inkwell charger to alter a rotational position of the stylus 220 within the cavity of the inkwell charger. In some examples, the ferromagnetic material can be iron, steel, ferrite, or other types of ferromagnetic materials.

In some examples, the stylus 220 can include a button 231. The button 231 can be utilized to provide additional selections and/or additional functionality for the stylus 220. In some examples, a first contact with the stylus tip 228 when the button 231 is not depressed can provide a first function and a second contact with the stylus tip 228 when the button 231 is depressed can provide a second function.

The stylus 220 can be utilized with a stylus inkwell charger as described herein. The functional end 224 of the stylus 220 can be inserted into the cavity of the stylus inkwell charger and the rotational position of the stylus 220 can be altered to a charging position as described herein. In addition, the tapered portion of the functional end 224 can also allow a user to more easily utilize the stylus tip 228 compared to other stylus types.

Figure 3:
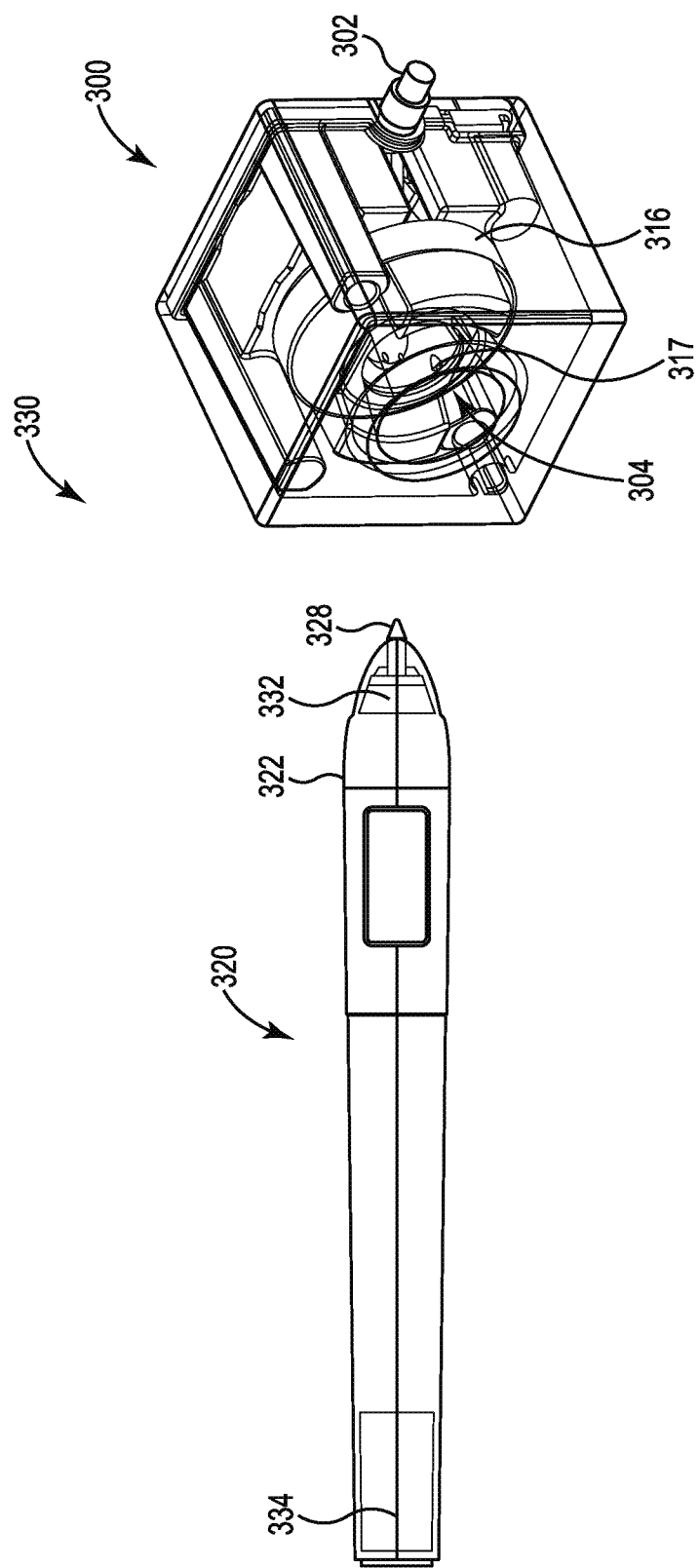
FIG. 3 illustrates an example of a system for a stylus inkwell charger consistent with the present disclosure.

FIG. 3 illustrates an example of a system 330 for a stylus inkwell charger consistent with the present disclosure. In some examples, the system 330 can include an inkwell charger 300 that can be the same or similar as inkwell charger 100 as referenced in FIG. 1. In some examples, the system 330 can include a stylus 320 that can be the same or similar as stylus 220 as referenced in FIG. 2. The system 330 can illustrate an example of internals for the stylus 320 and the inkwell charger 300.

As described herein, the inkwell charger 300 can include an electrical connection 302 that can be connected to a power source. In some examples, the electrical connection 302 can be coupled to an enclosure of the inkwell charger 300 and/or electrical contacts within the cavity 304 of the inkwell charger 300. In some examples, the electrical contacts within the cavity 304 can include pogo pin contacts that can transfer electrical energy from the electrical connection 302 to corresponding electrical contacts of the stylus 320. As described herein, the stylus 320 can include computing components 334 that can provide functionality for the stylus 320. In some examples, the inkwell charger 300 can provide electrical energy to the stylus 320 for providing power to the computing components 334.

In some examples, the inkwell charger 300 can include a cavity 304 as described herein. The cavity 304 can include a number of protrusions 317 that can help reduce friction between an enclosure 322 of the stylus 320 and an interior portion of the cavity 304. In some examples, the inkwell charger 300 can include a magnetic portion 316 that can be positioned below the cavity 304 of the inkwell charger 300. As described herein, the magnetic portion 316 can attract the ferromagnetic material 332 or provide a downward force on the stylus 320. When the magnetic portion 316 provides attracts the ferromagnetic material 332, the number of protrusions 317 can reduce the friction between the stylus 320 and the cavity 304 when the stylus 320 is rotating within the cavity 304. For example, the force applied by the magnetic portion 316 can force the tapered portion of the stylus 320 to rotate until it aligns with the tapered portion of the cavity 304.

In some examples, the ferromagnetic material 332 can be positioned within the enclosure 322 toward the tip 328 of the stylus 320 such that the magnetic portion 316 provides a rotational force on the stylus 320. For example, the magnetic attraction between the ferromagnetic material 322 positioned near an end of the tip (e.g., non-tapered portion of the stylus 320, etc.) can apply a rotational force on the stylus 320 to rotate the stylus 320 into a particular position within the cavity 304.

In some examples, the material 332 can be replaced with a magnetic material. For example, the material 332 can be a magnet that is positioned such that the magnetic portion 316 aligns the stylus 320 as described herein. For example, the material 332 can be a magnet with a first magnetic pole and a second magnetic pole. In this example, the magnetic portion 316 can include a corresponding first magnetic pole and a corresponding second magnetic pole. In this example, the poles of the magnet and the poles of the magnetic portion 316 can be positioned such that the magnet and magnetic portion 316 provide a rotational force and a downward force to align the electrical contacts of the inkwell charger 300 and the electrical contacts of the stylus 320.

In some examples, the magnetic portion 316 can be positioned such that a portion of the magnetic portion 316 can be positioned on a side of the cavity 304. That is, an upper portion of the magnetic portion 316 can extend to the same level as the bottom of the cavity 304 and/or can extend above the level of the bottom of the cavity 304. In some examples, the bottom of the cavity 304 can be a location that includes a stylus tip aperture (e.g., stylus tip aperture 108 as referenced in FIG. 1.

In some examples, the shape of the cavity 304 can correspond to a shape of the stylus 320. For example, the cavity 304 can include a tapered portion that can correspond to a tapered portion of a functional side of the stylus 320. In some examples, the shape of the cavity 304 and/or the shape of the stylus 320 can alter a rotational position of the stylus 320 from a non-charging position to a charging position. In some examples, the magnetic portion 316 of the inkwell charger 300 can interact with a ferromagnetic material 332 positioned within the enclosure 322 of the stylus 320.

In some examples, the ferromagnetic material 332 can be positioned on the functional side of the stylus 320 below the stylus tip 328 as described herein. In some examples, the interaction between the magnetic portion 316 of the inkwell charger 300 and the ferromagnetic material 332 within the stylus 320 can alter a rotational position of the stylus 320 when the stylus 320 is inserted into the cavity 304. In some examples, a combination of the shape of the cavity 304 and the magnetic pull of the magnetic portion 316 can alter the rotational position of the stylus into a charging position.

The system 330 can provide an inkwell charger 300 that can receive a stylus 320 at a plurality of different rotational positions and alter the stylus 320 to a charging position as described herein. This can enable a user to drop the stylus 320 into the cavity 304 without considering a rotational position of the stylus 320. This can also provide a decrease in user error that can be associated with improper placement on a charging device. In addition, the inkwell charger 300 can position the stylus 320 in a substantially vertical direction while the stylus 320 is charging, which can provide a relatively lower footprint on a work surface while the stylus 320 is charging.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. An inkwell charger, comprising:
    a tapered portion of a cavity comprising a ledge protruding from a surface of the tapered portion of the cavity including an electrical contact positioned on a top surface of the ledge to receive a corresponding tapered portion of a stylus comprising an electrical contact positioned within an indentation of the tapered portion of the stylus; and
    a magnetic portion of the cavity positioned below the tapered portion of the cavity to align the tapered portion of the stylus with the tapered portion of the cavity.

2. The inkwell charger of claim 1, wherein the corresponding tapered portion of the stylus includes a corresponding electrical contact that aligns with the electrical contact of the cavity when the tapered portion of the cavity and the corresponding tapered portion of the stylus are aligned.

3. The inkwell charger of claim 1, comprising a stylus aperture positioned opposite the tapered portion of the cavity to receive a stylus tip portion of the stylus.

4. The inkwell charger of claim 1, comprising a plurality of protrusions coupled to a surface of the cavity to prevent an exterior portion of the stylus from making direct contact with the surface of the cavity.

5. The inkwell charger of claim 1, wherein the electrical contact of the cavity includes a pogo pin electrical contact.

6. The inkwell charger of claim 5, wherein the magnetic portion of the cavity aligns the pogo pin electrical contact of the cavity with a corresponding pogo pad electrical contact of the stylus.

7. A stylus, comprising:
    a tapered portion positioned on a first side of an end of the stylus comprising a pogo pad electrical contact, wherein the tapered portion positioned on the first side includes an indentation to receive a corresponding ledge of an inkwell charger comprising a pogo pin electrical contact positioned on a top surface of the ledge;
    a tip portion positioned on a second side of the end of the stylus;
    a ferromagnetic material positioned within an enclosure of the stylus, positioned on the end of the stylus, to interact with a magnetic portion of the inkwell charger to:
        align the tapered portion of the stylus with a tapered portion of the inkwell charger;
        align the pogo pad electrical contact of the stylus with the pogo pin electrical contact of the inkwell charger; and
        align the tip portion to a tip aperture portion of the inkwell charger.

8. The stylus of claim 7, wherein the tapered portion of the stylus comprises a tapered structure that is formed by the enclosure.

9. The stylus of claim 7, wherein the pogo pad electrical contact and the tip portion are coupled to an exterior of the enclosure.

10. The stylus of claim 7, wherein the ferromagnetic material interacts with the magnetic portion of the inkwell charger to provide a contact between the pogo pad electrical contact and the pogo pin electrical contact despite an initial rotational position of the end of the stylus with relation to the inkwell charger.

11. A system for a stylus inkwell charger comprising:
    an inkwell charger comprising:
        a cavity to receive a stylus;
        a tapered portion of the cavity comprising a ledge protruding from a surface of the tapered portion of the cavity including an electrical contact positioned on a top surface of the ledge and connected to an electrical input; and a magnetic portion of the cavity positioned below the tapered portion of the cavity; and the stylus comprising:

a tapered end that corresponds to the tapered portion of the cavity comprising an electrical contact to couple to the electrical contact of the cavity, wherein the tapered end includes an indentation to receive the ledge protruding from the surface of the tapered portion of the cavity; and a ferromagnetic material positioned within an enclosure of the stylus within the tapered end of the stylus to interact with the magnetic portion of the inkwell charger to align the electrical contact of the cavity and the electrical contact of the stylus.

12. The system of claim 11, wherein the ferromagnetic material is positioned to interact with the magnetic portion of the inkwell charger to apply an attractive force between the electrical contact of the cavity and the electrical contact of the stylus.

13. The system of claim 11, wherein the ferromagnetic material is a ferrite material.

14. The system of claim 11, wherein the magnetic portion of the cavity includes a ring magnet positioned within an enclosure of the inkwell charger.

15. The system of claim 11, wherein the magnetic portion of the cavity is to alter a rotational direction of the stylus when positioned within the cavity.

* * * * *